3,414,636
ELASTIC-THERMOPLASTIC COPOLYMERS WITH GOOD THERMAL- AND LIGHT-STABILITY
Karl-Heinz Ott, Cologne-Stammheim, Harry Rohr, Cologne, Karl Dinges, Cologne-Stammheim, and Karl-Heinrich Knapp, Leverkusen, Germany, assignors to Farbenfabriken Bayer Aktiengesellchaft, Leverkusen, Germany, a German corporation
No Drawing. Filed July 20, 1964, Ser. No. 383,936
Claims priority, application Germany, Aug. 23, 1963, F 40,572
8 Claims. (Cl. 260—876)

ABSTRACT OF THE DISCLOSURE

A copolymer mixture of a rubber-elastic copolymer or graft copolymer of butadiene and a thermoplastic copolymer of styrene and acrylonitrile or of alkyl derivatives thereof stabilized with a synergistic mixture of 2,2'-methylene-bis-4-methyl-6-cyclohexylphenol and zinc sulphide.

---

The present invention relates to moulding composition with good thermal- and light-stability containing elastic thermoplastic copolymer mixtures.

The known thermoplastic moulding compositions containing copolymer mixtures of butadiene, styrene and acrylonitrile polymers have the particular advantage of combining a high impact strength with high hardness and tensile strength as well as a good processibility. Furthermore, such copolymer mixtures also have a very good thermal stability, particularly dimensional stability. All these polymers, however, show a more or less strong discolouration when dried or processed at elevated temperatures in the presence of atmospheric oxygen. Very high quantities of pigment are required in order to mask this thermal discolouration of the "raw material," especially when very light colour pastel colours are desired. A high pigment content however, is directly linked with a drop in the mechanical value especially of the notched bar and impact strength. A further disadvantage is the fact that the degree of the discolouration cannot precisely be controlled, i.e. it will vary even under identical drying and processing conditions, so that the amount of pigment required will vary from batch to batch.

A number of substances including phenols, substituted phenols, substituted bisphenols, polyhydroxyphenols, substituted amines, substituted sulphonamides, phosphorous acid esters, dithiocarbamates and phenthiazines, as well as synergistic mixtures of these components, have been proposed for the stabilisation of the thermoplastic moulding compositions containing copolymer mixtures of butadiene, styrene and acrylonitrile. These known stabilisers or stabiliser mixtures do not, however, offer sufficient protection when moulding compositions of the type mentioned above are dried or processed under the conditions usual in practice. In all cases, variations of the "raw tint" occur from batch to batch, giving rise to the difficulties mentioned above.

It has now been found that thermoplastic, elastic synthetic plastic materials, comprising copolymer mixtures of a butadiene elastomer and a thermoplastic copolymer of styrene and acrylonitrile can be obtained which, in addition to the good mechanical properties of these products, also possess excellent thermal stability and very good fastness to light, when such polymer mixtures are mixed with small amounts of a synergistic composition consisting of 2,2'-methylene-bis-4-methyl-6-cyclohexyl-phenol and zinc sulphide. This effect was all the more surprising in view of the fact that the two components of this mixture do not by themselves bring about any improvement in thermal and light-stability. Such effects can only be achieved by using a synergistic mixture of these two components.

It was found in particular that thermoplastic compositions having good thermal and light-stability are obtained, when to a copolymer mixture composed of (A) 5 to 60% by weight of a rubber-elastic copolymer or graft-copolymer of butadiene,
(B) 95 to 40% by weight of a thermoplastic component consisting of
    (a) 50 to 95% by weight of styrene and
    (b) 50 to 5% by weight of acrylonitrile, or of the alkyl derivatives of these two monomers, wherein the sum of acrylonitrile and styrene in the components A and B together may not be less than 50% by weight, there are added
(C) 0.1 to 4% by weight of a mixture of
    (a) 1–80% preferably 1–50% by weight of 2,2'-methylene-bis-4-methyl-6-cyclohexyl-phenol and
    (b) 99–20% preferably 99–50% by weight zinc sulphide, calculated on the above mixture.

In a preferred embodiment of the invention, the elastic-thermoplastic copolymer mixture consists of (A) 5 to 99% by weight, preferably 5 to 60% by weight of a polymer, prepared by graft-copolymerisation of
    (a) 10 to 95% by weight, preferably 10 to 80% by weight of a mixture of
        (1) 50 to 90% by weight of styrene and
        (2) 50 to 10% by weight of acrylonitrile, wherein the two components may be replaced partly entirely by their respective alkyl derivatives, on
    (b) 90 to 5% by weight, preferably 90 to 20% by weight of a polymer of a conjugated diolefine with a portion of at least 80% by weight of copolymerized conjugated diolefine, and
(B) 0 to 94% by weight, preferably 10 to 92% by weight of a thermoplastic copolymer of
    (a) 50 to 95% by weight of styrene and
    (b) 50 to 5% by weight of acrylonitrile, or of the alkyl derivatives of these monomers, wherein the sum of acrylonitrile and styrene in the components A and B together must not be less than 50% by weight, and
(C) 0.1 to 4% by weight of a mixture of
    (1) 1 to 50% by weight of 2,2'-methylene-bis-4-methyl-6-cyclohexyl-phenol and
    (2) 99 to 50% by weight of zinc sulphide.

It appears from the foregoing that the resin-forming monomers (i.e. styrene and acrylonitrile), preferably in the form of a copolymer B are extended with the graft-polymer component A (as indicated by the preferred ranges above). In addition, it is also possible to graft these resin-forming monomers on the grafting base A at the outset, in which instance they do not need to be separately extended with the copolymer component B.

According to a modification of the present invention, copolymers of conjugated dienes, such as copolymers of butadiene with isoprene and other 1,3-dienes as well as copolymers of conjugated diolefines, with up to 50% of a further copolymerisable monovinyl compound, such as styrene and/or acrylonitrile may be employed as elastomer-component A, instead of pure polybutadiene. Furthermore, it is possible to replace the styrene and/or the acrylonitrile partly or wholly by their respective alkyl derivatives, in particular α-methylstyrene, nuclear-alkylated styrene or methacrylonitrile. It is also possible to modify the rubber-elastic component by the addition of small amounts of a monomer having a crosslinking effect, e.g. divinyl benzene, in such a manner that more than 80% of this component is insoluble in toluene.

When proceeding according to the preferred embodiment, i.e. when the rubber-elastic component A is a graft-polymer, as already described, then, instead of polybutadiene, copolymers of conjugated diolefines, e.g. copolymers of butadiene with isoprene and other 1,3-dienes as well as copolymers of conjugated diolefines with up to 10% of another copolymerisable monovinyl compound, such as styrene and/or acrylonitrile, may be employed as grafting-base. Here again, it is possible to replace the components to be grafted on, i.e. styrene or acrylonitrile, wholly or partly by their respective alkyl derivatives. Of particular interest as grafting-base are polymers containing at least 90% of homopolymerised butadiene, more than 80% of which is insoluble in toluene.

According to a preferred embodiment of the invention, the grafting-base of the graft-copolymer components A, i.e. the polymer of a diolefine with at least 90% of conjugated diolefine, is a homopolymer of butadiene.

A styrene-acrylonitrile copolymer is preferably employed as thermoplastic copolymer component B. As with the rubber-elastic component, here also the styrene and acrylonitrile can be replaced wholly or partly by their respective alkyl derivatives, especially α-methylstyrene and/or nuclear-substituted styrene or methacrylonitrile. Of primary interest here are thermoplastic copolymers of 95 to 65% by weight of styrene and 5 to 35% by weight of acrylonitrile, wherein the styrene may be entirely replaced by α-methylstyrene.

The stabilising component C employed according to the present invention to protect the polymers against the influence of oxygen at elevated temperatures is, in the preferred embodiment, a combination of zinc sulphide with 2,2′ - methylene-bis-4-methyl-6-cyclohexylphenol, used in the amounts indicated

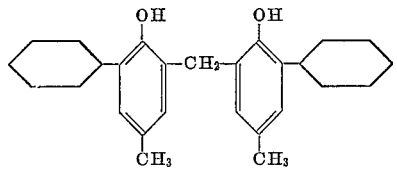

Although other substituted bisphenols show similar effects (see the following examples), their effectiveness is far less than that of the above-described combination.

The preparation of the rubber-elastic component A can be carried out in a manner itself known by emulsion-polymerisation of the corresponding monomers. In principle, the process will be the same as that of the preparation of the resin component B. If a graft-copolymer is employed as the rubber-elastic component A, according to the preferred embodiment of the present invention, then the polymerisation of the monomers to be grafted on (styrene and acrylonitrile) can take place in the latex of the polydiolefine (e.g. polybutadiene) serving as graft base. Here again, the process will be in principle the same as the preparation of the resin component B. A 1,3-diolefine, preferably a homo- or copolymer-latex of butadiene with at least 90% of 1,3-diolefine in the polymer, its preparation being carried out in known manner by emulsion-polymerisation of the monomers, is used as grafting base. In this step, there may, in principle, be employed the same emulsifiers, regulators, catalysts and electrolytes as in the preparation of B, within the limits there indicated.

The preparation of the thermoplastic copolymer component from styrene and acrylonitrile is preferably carried out by polymerisation of the monomers in aqueous emulsion. The conventional amounts of water, emulsifiers, regulators, polymerisation catalysts, pH regulators and other additives may be employed. The monomer- or polymer-concentration may, for example, be 20 to 50% by weight, i.e. 400 to 100 parts by weight of water will be employed for every 100 parts by weight of monomer.

Suitable emulsifiers includes, for example, sodium, potassium or ammonium salts of long-chain fatty acids with 10 to 20 carbon atoms, alkyl sulphates with 10 to 20 carbon atoms, alkyl sulphonates with 10 to 20 carbon atoms, alkyl-aryl-sulphates with 10 to 20 C-atoms or resin acids (e.g. derivatives of abietic acid). Emulsifiers that lose their emulsifying properties below pH 7 by formation of the free acid are preferably employed.

As regulators of the molecular weight, and thus of the K-value, there may be employed, for example, long-chain mercaptans, such as dodecyl mercaptan.

Inorganic or organic peroxy-compounds or azo-compounds, such as potassium or ammonium persulphate, tert.-butyl hydroperoxide, cumene hydroperoxide or azo-diisobutyronitrile may be used as polymerisation catalysts. It is also possible to use redox systems formed from the aforenamed compounds with reducing agents, especially acids of sulphur in less than its maximum valency state, such as formaldehydesulphoxylate, or bases like triethanolamine.

As pH-regulators there may be added for example salts of orthophosphoric acid or of pyrophosphoric acid. The polymerisation can be carried out at a pH from 2 to 11; the preferred pH range is from 7 to 11.

The polymerisation temperature may be 20 to 100° C., preferably 40 to 90° C.

The addition of the stabiliser component C to the copolymer component B and the rubber-elastic component A can be effected in several ways:

(1) The stabiliser component C can be mixed with a pre-dried powder of the components A and B, for example by means of a ball mill; in which case, however, the stabiliser component will not be present during the drying.

(2) The stabiliser combination C can also be worked into a dry powder of the copolymer mixture with the aid of suitable mixing apparatus, for example a single or double screw extruder or a Banbury-mixer, advantageously with simultaneous addition of pigments.

(3) In a preferred embodiment of the present invention, the individual components of the stabiliser combination C are added, in the form of an aqueous emulsion (phenolic component) and an aqueous dispersion (zinc sulphide component), respectively, to the mixture of the latices of the components A and B, advantageously at room temperature (as will be described in detail later on), and this mixture is then coagulated in a manner itself known.

The preparation of the aqueous emulsion of the phenolic component of the stabiliser combination C can be carried out by stirring a benzene solution of the relevant phenol into an aqueous solution of the emulsifier with the aid of a high-speed stirrer. The ratio of the weight of water to be employed to the benzene solution is advantageously from 1:1 to 2:1. The same emulsifiers are employed as in the preparation of the elastomer component A or of the thermoplastic component B (see above), in amounts of 0.5 to 5% by weight, calculated on the benzene solution.

Potassium tripolyphosphate is used as dispersion stabiliser in the preparation of the aqueous dispersion of the zinc sulphide component. The ratio, water:zinc sulphide:potassium tripolyphosphate is expediently 100:100:0.5. The preparation itself is carried out by mixing intimately the water, zinc sulphide and potassium tripolyphosphate over 24 hours using a ball mill. A stable aqueous dispersion results.

The coagulation of the mixtures according to the preferred embodiment (see 3) can be effected according to known methods, by treating the latex mixture with electrolytes, especially inorganic acids or salts and, if desired, heating to higher temperatures. The nature of the coagulant employed depends upon the emulsifiers present in the mixture. If the emulsifiers are effective in both the acid and alkaline ranges (alkyl sulphates and sulphonates), electrolytes, such as sodium chloride, calcium chloride, magnesium sulphate or aluminium sulphate will normally be employed. With emulsifiers which lose their effect in the acid range, the addition of an acid, e.g., hydrochloric acid or acetic acid, suffices to effect coagulation.

It is also possible to bring about the coagulation by cooling the mixture to temperatures below 0° C. ("freeze-out").

The processing of the coagulums is carried out by methods analogous to those known for processing coagulums of elastic-thermoplastic copolymer mixtures, i.e., by separating the coagulum, washing it free from electrolytes or to neutrality, and drying it at a temperature below 100° C., advantageously in vacuo. The dried material is subsequently consolidated on suitable apparatus, such as roller mills, at temperatures from 130 to 180° C. and homogenised and, if desired, granulated. The compact masses so obtained, which have been stabilised simultaneously against heat and light, can be subjected to shaping processes on known processing machines, such as injection moulding machines.

It is possible to incorporate the usual fillers, pigments or releasing agents such as zinc stearate, calcium stearate or waxes into the thermoplastic moulding compositions obtainable by the present process.

The moulding compositions prepared according to the invention are characterised by a very good thermal stability, and linked with this, an equally good stability against light, in addition to good mechanical data. This was all the more surprising in view of the fact that the individual components of the stabiliser combination C do not show this effect. Thus, when using the combination, it is possible to obtain moulding compositions with a constant clear "raw tint" so that a universally valid pigment formulation can be set up and the pigment content can be reduced to a minimum. The stabilisation further ensures that a variable temperature stress during the processing, e.g., injection moulding, extrusion or calendering, cannot affect the predetermined colour. At the same time, the moulding compositions stabilised in this manner show a very good resistance to light of the most diverse wavelengths.

Unless otherwise indicated, the parts and percentages indicated in the following examples are parts by weight.

EXAMPLE 1

3660 g. of a 29.6% latex of a graft-polymer of 36 parts of styrene and 14 parts of acrylonitrile on 50 parts of polybutadiene (average particle size in the latex: 0.4 to 0.6 micron), were mixed with 4680 g. of a 43.0% latex of a copolymer of 70 parts of styrene and 30 parts of acrylonitrile with a K-value of 59.3 (see Fikentscher, Cellulosechemie 13, 58, 1932) and an intrinsic viscosity of 0.80 to 0.71. The ratio of graft-polymer to resin was then 35:65. Into this latex mixture there were then introduced 65.3 g. of a 16.6% aqueous emulsion of 2,2'-methylene-bis-4-methyl-6-cyclohexylphenol, as well as 28.8 g. of a 53.8% aqueous dispersion of zinc sulphide. Calculated on the total polymer, this mixture accordingly contained 0.35% of 2,2'-methylene-bis - 4 - methyl - 6 - cyclohexylphenol and 0.5% of zinc sulphide. The polymer mixture stabilised in this manner was coagulated with the aid of 2% aqueous acetic acid; the coagulate was separated, washed to neutrality and dried in vacuo at 70 to 80° C.

The dried material was consolidated within 10 minutes in a roller mill heated at 160° C. and then pressed into plates 1 mm. thick. Strips of this material 2 cm. wide were exposed on an aluminium sheet to a temperature of 170° C. in an air-circulation oven. Sample strips were withdrawn at one-hourly intervals. The test was carried on for 7 hours. The samples thus treated showed graded discolouration on their surface, from a light beige colour to yellowish-brown or from grey to grey-brown.

To describe the results of the experiments in the form of tables with numerical values, the samples, lined up in a row, were first photographed with a panchromatic film, in order to obtain the grey-values of the colour tones appearing and to compare these. The grey-values of the discoloured samples were then determined with the aid of a greyness scale running from 1 to 12. The grey-values obtained are listed in Table 1, column 1.

Comparative Examples A and B

Here, the stabilisation of the polymer mixture described in Example 1 was carried out by adding only the 2,2'-methylene-bis-4-methyl-6-cyclohexylphenol emulsion in the comparative Example A and only the zinc sulphide dispersion in Example B. Accordingly, the polymer mixture in the comparative Example A contained only 0.35% of the phenolic component and in the comparative Example B only 0.5% of zinc sulphide, calculated on the total solid polymer. The further processing of the latex mixture, the processing of the moulding compositions to form the pressed plates and the testing of these pressed moulding compositions with regard to thermal stability was carried out in the same manner as in Example 1. The degrees of greyness determined in these samples in function of time are listed in Table 1, under A and B respectively.

Comparative Examples C, D, E, F and G

In this series of comparative experiments, the 2,2'-methylene-bis-4-methyl-6-cyclohexylphenol was replaced by other phenolic stabilisers in combination with zinc sulphide. As in Example 1, the graft-polymer:resin ratio was 35:65. The incorporation of the stabiliser combinations into the polymer mixture was again effected using aqueous emulsions and dispersions. Calculated on the solid polymer, each batch contained 0.35% of phenolic stabiliser and 0.5% of zinc sulphide. The working-up, drying and further processing of the moulding compositions to pressed plates and the testing of the thermal stability of these pressed plates was carried out in the same manner as in Example 1. The following Table 1 lists the phenolic stabilisers employed in the comparative examples.

TABLE 1

|  | Test example 1 | Comparative example | |
|---|---|---|---|
|  |  | A | B |
| Graft polymer portion | 35 | 35 | 35 |
| Copolymer portion; Styrene-acrylonitrile 72:28, K-value 59.3; $\eta_i$=0.71—0.80 | 65 | 65 | 65 |
| Percent zinc sulphide, calculated on total polymer | 0.5 |  | 0.5 |
| Percent 2,2'-methylene-bis-4-methyl-6-cyclohexylphenol | 0.35 | 0.35 |  |
| Greyness value after hours: |  |  |  |
| 0 hour | 1 | 2 | 1 |
| 1 hour | 2 | 5 | 2 |
| 2 hours | 3 | 6 | 4 |
| 3 hours | 3 | 6 | 4 |
| 4 hours | 4 | 7 | 4 |
| 5 hours | 4 | 8 | 5 |
| 6 hours | 4 | 10 | 7 |
| 7 hours | 6 | 10 | 8 |

Comparative Examples          Phenolic stabiliser
   C____ 2,6-di-t-butyl-p-cresol
   D____ 2,6-di-t-butyl-4-ethoxy-phenol
   E____ 2,2'-methylene-bis-4-methyl-6-t-butylphenol
   F____ 2,2'-methylene-bis-4-ethyl-6-t-butylphenol
   G____ 2,2'-methylene-bis-4-methyl-6-nonylphenol The greyness values determined on the pressed plates as a function of time of the temperature- and oxygen-exposure are listed in Table 2 under C, D, E, F and G.

TABLE 2

|  | Comparative examples | | | | |
| --- | --- | --- | --- | --- | --- |
|  | C | D | E | F | G |
| Graft polymer portion | 35 | 35 | 35 | 35 | 35 |
| Copolymer portion Styrene-acrylonitrile 70:30, K-value 59; $\eta_i$=0.71–0.80 | 65 | 65 | 65 | 65 | 65 |
| Percent Zinc sulphide, calculated on the total polymer | 0.5 | 0.5 | 0.5 | 0.5 | 0.5 |
| Percent phenolic stabiliser, calculated on the total polymer | 0.35 | 0.35 | 0.35 | 0.35 | 0.35 |
| Grey-values after hours: |  |  |  |  |  |
| 0 hour | 1 | 1 | 1 | 3 | 1 |
| 1 hour | 2 | 2 | 2 | 5 | 3 |
| 2 hours | 3 | 3 | 6 | 5 | 3 |
| 3 hours | 3 | 3 | 7 | 8 | 4 |
| 4 hours | 4 | 4 | 8 | 8 | 4 |
| 5 hours | 6 | 5 | 8 | 10 | 6 |
| 6 hours | 8 | 7 | 8 | 10 | 7 |
| 7 hours | 9 | 8 | 10 | 10 | 8 |

Comparative Example H

In this example, the stabilisation of the polymer mixture described in Example 1 was effected by introducing, calculated on the total solid polymer, 3% of trinoylphenyl phosphite, in the form of an aqueous emulsion, and 0.5% of zinc sulphide, in the form of an aqueous dispersion, into the latex mixture. The working-up, drying and further processing of the moulding compositions to pressed plates and the testing of the thermal stability of these pressed plates were again carried out in the same manner as in Example 1. The greyness values determined as a function of the length of the thermal- and oxygen-exposure are listed in Table 3 under H.

Comparative Examples J and K

Instead of the stabiliser combination described in Example 1, consisting of 0.35% of 2,2'-methylene-bis-4-methyl-6-cyclohexylphenol and 0.5% of zinc sulphide (calculated on the solid polymer), a combination of 2,2'-methylene-bis-4-methyl-6-cyclohexylphenol and calcium sulphide (Example J) or barium sulphide (Example K) was used. The easily-hydrolysable sulphide components were, in both examples, worked in on a roller mill heated to 160° C. during the consolidation of the dry moulding composition. The phenolic components of these stabiliser systems were again introduced in the form of aqueous emulsions. The further processing to test bodies of the moulding compositions so stabilised was carried out in the same manner as in Example 1. The greyness values found with these test bodies, as a function of the length of exposure to heat and oxygen are listed in Table 3, under J and K respectively:

TABLE 3

|  | Comparative examples | | |
| --- | --- | --- | --- |
|  | H | J | K |
| Graft-polymer portion | 35 | 35 | 35 |
| Copolymer portion; Styrene-acrylonitrile 72:28, K-value 59.3; $\eta_i$=0.71–0.80 | 65 | 65 | 65 |
| Percent ZnS, calculated on total polymer | 0.5 |  |  |
| Percent CaS, calculated on total polymer |  | 0.5 |  |
| Percent BaS, calculated on total polymer |  |  | 0.5 |
| Percent 2,2'-methylene-bis-4-methyl-6-cyclohexylphenol |  | 0.35 | 0.35 |
| Percent trinonylphenyl-phosphite | 3.0 |  |  |
| Greyness values after hours: |  |  |  |
| 0 hour | 2 | 2 | 2 |
| 1 hour | 4 | 4 | 5 |
| 2 hours | 5 | 5 | 6 |
| 3 hours | 6 | 6 | 6 |
| 4 hours | 6 | 6 | 7 |
| 5 hours | 7 | 6 | 8 |
| 6 hours | 8 | 6 | 10 |
| 7 hours | 8 | 7 | 10 |

EXAMPLE 2

2670 g. of a 29.0% latex of a graft polymer of 36 parts of styrene and 14 parts of acrylonitrile on 50 parts of polybutadiene (average particle size in the latex: 0.4 to 0.6 micron) were mixed with 5340 g. of a 43.6% latex of a copolymer of 70 parts of styrene and 30 parts acrylonitrile with a K-value of 59.3 and an intrinsic viscosity of 0.80 to 0.71. The ratio of graft-polymer to resin was then 25:75. 65.3 g. of a 16.6% aqueous emulsion of 2,2'-methylene-bis-4-methyl-6-cyclohexylphenol and 28.8 g. of a 53.8% aqueous dispersion of zinc sulphide were stirred into the latex mixture. Accordingly, the mixture contained 0.35% of the phenolic antioxidant and 0.5% of zinc sulphide, calculated on the total polymer. The working-up, drying, further processing and testing were carried out as in Example 1. The greyness values determined on the test plates as a function of the length of exposure to heat and oxygen are listed in Table 4, column 2.

EXAMPLES 3 AND 4

Using the latices already described in Example 1, latex mixtures were prepared, wherein 55 parts of graft polymer to 45 parts of styrene acrylonitrile resin (Example 3) and 10 parts of graft polymer to 90 parts of styrene-acrylonitrile resin (Example 4) were employed respectively. The stabilisation, working-up, drying and further processing of the moulding compositions to form the test bodies were carried out as in Example 1. The greyness values of the pressed test bodies, as a function of the length of exposure to heat and oxygen are listed in Table 4, under 3 and 4 respectively.

TABLE 4

|  | Examples | | |
| --- | --- | --- | --- |
|  | 2 | 3 | 4 |
| Graft-polymer portion | 25 | 55 | 10 |
| Copolymer portion; Styrene-acrylonitrile 72:28, K-value 59.3; $\eta_i$=0.71–0.80 | 75 | 45 | 90 |
| Percent of zinc sulphide, calculated on total polymer | 0.5 | 0.5 | 0.5 |
| Percent of 2,2'-methylene-bis-4-methyl-6-cyclohexylphenol | 0.35 | 0.35 | 0.35 |
| Greyness values after hours: |  |  |  |
| 0 hour | 1 | 1 | 1 |
| 1 hour | 2 | 2 | 2 |
| 2 hours | 3 | 3 | 3 |
| 3 hours | 3 | 3 | 3 |
| 4 hours | 3 | 4 | 4 |
| 5 hours | 4 | 4 | 4 |
| 6 hours | 4 | 4 | 4 |
| 7 hours | 5 | 6 | 6 |

EXAMPLE 5

The polymer mixture of Example 1 was stabilized in the same manner so that the total polymer contained 0.5% of 2,2'-methylene-bis-4-methyl-6-cyclohexylphenol and 1% of ZnS, and the working-up, drying and further processing were carried out as described in that example. The pressed plates prepared from these moulding compositions showed the greyness-values listed in Table 5.

EXAMPLE 6

The already repeatedly described latex of a graft-polymer of 36 parts of styrene and 14 parts of acrylonitrile on 50 parts of polybutadiene (average particle size of the polybutadiene 0.4 to 0.6 micron, measured with the ultracentrifuge) was mixed with a latex of a copolymer of 70 parts of α-methylstyrene and 30 parts of acrylonitrile (K-value 60; $\eta_i$=0.87–0.90) in such a manner that for 30 parts of graft copolymer there were 70 parts of α-methylstyrene, proceeding otherwise in the same manner as in Example 1. Test bodies prepared from this stabilized moulding composition showed the greyness values listed in Table 5 under 6.

TABLE 5

|  | Examples | |
|---|---|---|
|  | 5 | 6 |
| Graft-polymer portion | 35 | 30 |
| Copolymer portion; Styrene-acrylonitrile 70:30, K-value 59.3 $\eta_i$=0.71–0.80 | 65 |  |
| α-methylstyrene-acrylonitrile 70:30; K-value 60; $\eta_i$= 0.87–0.90 |  | 70 |
| Percent ZnS, calculated on total polymer | 1.0 | 0.5 |
| Percent 2,2'-methylene-bis-4-methyl-6-cyclohexylphenol | 0.15 | 0.35 |
| Greyness-values after hours: |  |  |
| 0 hour | 1 | 2 |
| 1 hour | 2 | 2 |
| 2 hours | 3 | 3 |
| 3 hours | 3 | 3 |
| 4 hours | 4 | 4 |
| 5 hours | 4 | 5 |
| 6 hours | 5 | 6 |
| 7 hours | 6 | 6 |

EXAMPLE 7

2340 g. of a 29% latex of a graft-polymer of 14 parts of styrene and 6 parts of acrylonitrile on 80 parts of polybutadiene latex with an average particle size below 0.1 micron (measured with the ultracentrifuge), were mixed with 5590 g. of a 43.6% latex of a copolymer of 70 parts of styrene and 30 parts of acrylonitrile with a K-value of 60 and an intrinsic viscosity of 0.87–0.93. The ratio of graft-polymer to resin was then 22:78. The stabilisation of this polymer mixture was effected in the same manner as in Example 1, so that, calculated on the total polymer, 0.85% of 2,2'-methylene-bis-4-methyl-6-cyclohexylphenol and 0.5% zinc sulphide were contained in the mixture. The working-up, drying and preparation of the test bodies for the heat-oxygen test was carried out as in Example 1. Table 6 lists the greyness-values found in the pressed plates.

TABLE 6

|  | Example 7 |
|---|---|
| Graft-polymer portion | 22 |
| Copolymer portion, styrene-acrylonitrile 70:30; K-value 60; $\eta_i$=0.87–0.93 | 78 |
| ZnS, calculated on the total polymer, percent | 0.5 |
| 2,2'-methylene-bis-4-methyl-6-cyclohexylphenol, percent | 0.85 |
| Greyness-values after hours: |  |
| 0 | 1 |
| 1 | 2 |
| 2 | 3 |
| 3 | 3 |
| 4 | 4 |
| 5 | 4 |
| 6 | 5 |
| 7 | 6 |

EXAMPLES 8, 9 AND 10

Latex mixtures with varying ratios graftpolymer:styrene-acrylonitrile resin were prepared employing the latices as described in detail in Example 1. These latex mixtures were stabilized by admixing of 16.6% aqueous emulsion of 2,2'-methylene-bis-4-methyl-6-cyclohexylphenol and a 53.8% aqueous dispersion of zinc sulphide. The ratios by weight were chosen in such a manner that a stabilization is obtained as given in Table 7. Working up, drying and preparation of the specimens was performed as described in Example 1. Ratios of the components and results of the heat-oxygen-tests are listed in the following Table 7 (all percentages are by weight).

TABLE 7

|  | Examples | | |
|---|---|---|---|
|  | 8 | 9 | 10 |
| Percent graft polymer | 55 | 25 | 10 |
| Percent styrene-acrylonitrile resin (ratio styrene:acrylonitrile 72:28) K-value 60; $\eta_i$=0.87–0.93 | 45 | 75 | 90 |
| Percent zinc sulphide (calculated on total amount of polymer) | 0.5 | 0.5 | 0.5 |
| Percent 2,2'-methylene-bis-methyl-6-cyclohexylphenol | 0.55 | 0.25 | 0.10 |
| Greyness values after hours: |  |  |  |
| 0 hour | 1 | 1 | 1 |
| 1 hour | 2 | 2 | 2 |
| 2 hours | 3 | 3 | 3 |
| 3 hours | 3 | 3 | 3 |
| 4 hours | 4 | 3 | 4 |
| 5 hours | 4 | 4 | 4 |
| 6 hours | 4 | 4 | 4 |
| 7 hours | 5 | 4 | 5 |

What we claim is:
1. Elastic-thermoplastic moulding compositions with good thermal and light-stability, prepared from
   (A) 5 to 60% by weight of a rubber-elastic butadiene polymer
   (B) 95 to 40% by weight of a thermoplastic copolymer, composed of
      (a) 50 to 95% by weight of styrene and
      (b) 50 to 5% by weight of acrylonitrile or the respective alkyl derivatives of these two components, wherein the sum of acrylonitrile and styrene in the components A and B together is not less than 50% by weight, and
   (C) 0.1 to 4% by weight, based on the combined weight of A and B, of a mixture of
      (a) 1 to 50% by weight of 2,2'-methylene-bis-4-methyl-6-cyclohexylphenol and
      (b) 99 to 50% by weight of zinc sulphide.
2. Elastic-thermoplastic moulding compositions with good thermal and light-stability, consisting of
   (A) 5 to 99% by weight of a graft-copolymer, prepared by graft-copolymerisation of
      (a) 10 to 95% by weight of a mixture of
         (1) 50 to 90% by weight of styrene and
         (2) 50 to 10% by weight of acrylonitrile, wherein these two components may be replaced at least partly by their respective alkyl derivatives, on
      (b) 90 to 5% by weight of a conjugated diolefine polymer comprising at least 80% by weight of homo-polymerised conjugated diolefine and
   (B) 0 to 94% by weight of a thermoplastic copolymer composed of
      (a) 50 to 95% by weight of styrene and
      (b) 50 to 5% by weight of acrylonitrile or of the alkyl derivatives of these two components, wherein the sum of styrene and acrylonitrile in A and B together may not be less than 50% by weight, and
   (C) 0.1 to 4% by weight, based on the combined weight of A and B, of a mixture of
      (1) 1 to 50% by weight of 2,2'-methylene-bis-4-methyl-6-cyclohexylphenol and
      (2) 99 to 50% by weight of zinc sulphide.
3. Elastic-thermoplastic moulding compositions according to claim 2, composed of
   (A) 5 to 60% by weight of a graft-copolymer of
      (a) 10 to 80% by weight of a mixture containing
         (1) 50 to 90% by weight of styrene and
         (2) 50 to 10% by weight of acrylonitrile or their respective alkyl derivatives, on
      (b) 20 to 90% by weight of a polymer of a conjugated diolefine with at least 90% by weight of homo-polymerised diolefine and
   (B) 30 to 94% by weight of a thermoplastic copolymer formed of
      (a) 50 to 95% by weight of styrene and
      (b) 50 to 5% by weight of acrylonitrile, or their respective alkyl derivatives, and

(C) 0.1 to 4% by weight, based on the combined weight of A and B, of a mixture of
  (1) 1 to 50% by weight of 2,2'-methylene-bis-4-methyl-6-cyclohexylphenol and
  (2) 99 to 50% by weight of zinc sulphide.

4. Elastic-thermoplastic moulding compositions with good thermal and light-stability, prepared from
(A) 5 to 60% by weight of a rubber-elastic butadiene polymer
(B) 95 to 40% by weight of a thermoplastic copolymer, composed of
  (a) 50 to 95% by weight of styrene and
  (b) 50 to 5% by weight of acrylonitrile or the respective alkyl derivatives of these two components, wherein the sum of acrylonitrile and styrene in the components A and B together is not less than 50% by weight and
(C) 0.1 to 4% by weight, based on the combined weight of A and B, of a mixture of
  (a) 1 to 80% by weight of 2,2'-methylene-bis-4-methyl-6-cyclohexylphenol and
  (b) 99 to 20% by weight of zinc sulphide.

5. The process for the preparation of an elastic-thermoplastic moulding composition having good thermal and light-stability which comprises mixing 5 to 60% by weight of (A) a latex of a graft polymer of about 50% by weight polybutadiene and about 50% by weight of a styrene/acrylonitrile mixture, with 95–40% by weight of (B) a latex of a 70/30 styrene/acrylonitrile copolymer, adding to the resulting mixture about 0.35% of 2,2'-methylene-bis-4-methyl-6-cyclohexylphenol and about 0.5% of zinc sulphide, the latter two percentages being based on the weight of total polymer, and then coagulating the latex mixture.

6. The process of claim 5 wherein the ratio of graft polymer A to copolymer B is 35:65.

7. The process of claim 5 wherein the ratio of graft polymer A to copolymer B is 25:75.

8. The process of claim 5 wherein the ratio of graft polymer A to copolymer B is 55:45.

References Cited

UNITED STATES PATENTS

| | | | |
|---|---|---|---|
| 2,923,753 | 2/1960 | Leyland et al. | 260—619 |
| 2,965,604 | 12/1960 | Heinz et al. | 260—45.95 |
| 3,267,069 | 8/1966 | Cummings | 260—45.95 |

GEORGE F. LESMES, *Primary Examiner.*